(12) United States Patent
Lee et al.

(10) Patent No.: US 12,738,525 B2
(45) Date of Patent: Sep. 15, 2026

(54) METHOD FOR MANUFACTURING ELECTRODE ASSEMBLY

(71) Applicant: LG ENERGY SOLUTION, LTD., Seoul (KR)

(72) Inventors: So Yeong Lee, Daejeon (KR); Won Sik Bae, Daejeon (KR); Dong Wook Sung, Daejeon (KR)

( * ) Notice: Subject to any disclaimer, the term of this patent is extended or adjusted under 35 U.S.C. 154(b) by 38 days.

(21) Appl. No.: 18/834,988

(22) PCT Filed: Jul. 27, 2023

(86) PCT No.: PCT/KR2023/010891
§ 371 (c)(1),
(2) Date: Jul. 31, 2024

(87) PCT Pub. No.: WO2024/034934
PCT Pub. Date: Feb. 15, 2024

(65) Prior Publication Data

US 2025/0167279 A1 May 22, 2025

(30) Foreign Application Priority Data

Aug. 9, 2022 (KR) ........................ 10-2022-0098947

(51) Int. Cl.
*H01M 10/04* (2006.01)
*H01M 50/466* (2021.01)

(52) U.S. Cl.
CPC ..... *H01M 10/0459* (2013.01); *H01M 50/466* (2021.01)

(58) Field of Classification Search
CPC .......... H01M 10/0459; H01M 10/0583; B29C 53/04
See application file for complete search history.

(56) References Cited

U.S. PATENT DOCUMENTS

2021/0184242 A1* 6/2021 Lee .................. H01M 10/0583

FOREIGN PATENT DOCUMENTS

| | | | | |
|---|---|---|---|---|
| CN | 113991164 | A | | 1/2022 |
| JP | 2007242507 | A | | 9/2007 |
| JP | 2018018712 | A | * | 2/2018 |
| JP | 2018532240 | A | | 11/2018 |
| JP | 6453515 | B1 | | 1/2019 |
| JP | 2022023488 | A | | 2/2022 |

(Continued)

OTHER PUBLICATIONS

Machine Translation of JP2016-148714 (Year: 2018).*

*Primary Examiner* — Daniel McNally
(74) *Attorney, Agent, or Firm* — Bryan Cave Leighton Paisner LLP

(57) ABSTRACT

A method for manufacturing an electrode assembly is provided. The method includes forming a laminate in which a positive electrode, a separator, and a negative electrode are alternately disposed by alternately arranging positive electrodes and negative electrodes on a separator, which is zigzag folded and forms a bend; fixing positions of the positive electrode and the negative electrode relative to the separator by applying heat and pressure to the laminate; attaching the positive electrode, the separator, and the negative electrode by applying heat and pressure to the laminate; and forming an electrode assembly by cutting a side of the laminate, wherein the side of the laminate includes the bend.

13 Claims, 6 Drawing Sheets

(56) References Cited

FOREIGN PATENT DOCUMENTS

| | | | | | |
|---|---|---|---|---|---|
| KR | 10-2011-0048132 | A | | 5/2011 | |
| KR | 10-2013-0140289 | A | | 12/2013 | |
| KR | 10-1349205 | B1 | | 1/2014 | |
| KR | 10-2015-0034944 | A | | 4/2015 | |
| KR | 20150034944 | A | * | 4/2015 | ........ H01M 10/0413 |
| KR | 10-2015-0049892 | A | | 5/2015 | |
| KR | 10-1559834 | B1 | | 10/2015 | |
| KR | 10-1590217 | B1 | | 1/2016 | |
| KR | 10-2017-0050220 | A | | 5/2017 | |
| KR | 10-2018-0006324 | A | | 1/2018 | |
| KR | 101951783 | B1 | | 2/2019 | |
| KR | 10-2019-0039982 | A | | 4/2019 | |
| KR | 10-2020-0057978 | A | | 5/2020 | |
| KR | 10-2108113 | B1 | | 5/2020 | |
| KR | 10-2020-0073569 | A | | 6/2020 | |
| KR | 10-2021-0129541 | A | | 10/2021 | |
| KR | 10-2311950 | B1 | | 10/2021 | |
| KR | 10-2021-0152633 | A | | 12/2021 | |
| KR | 10-2022-0017760 | A | | 2/2022 | |

* cited by examiner

【FIG. 1】
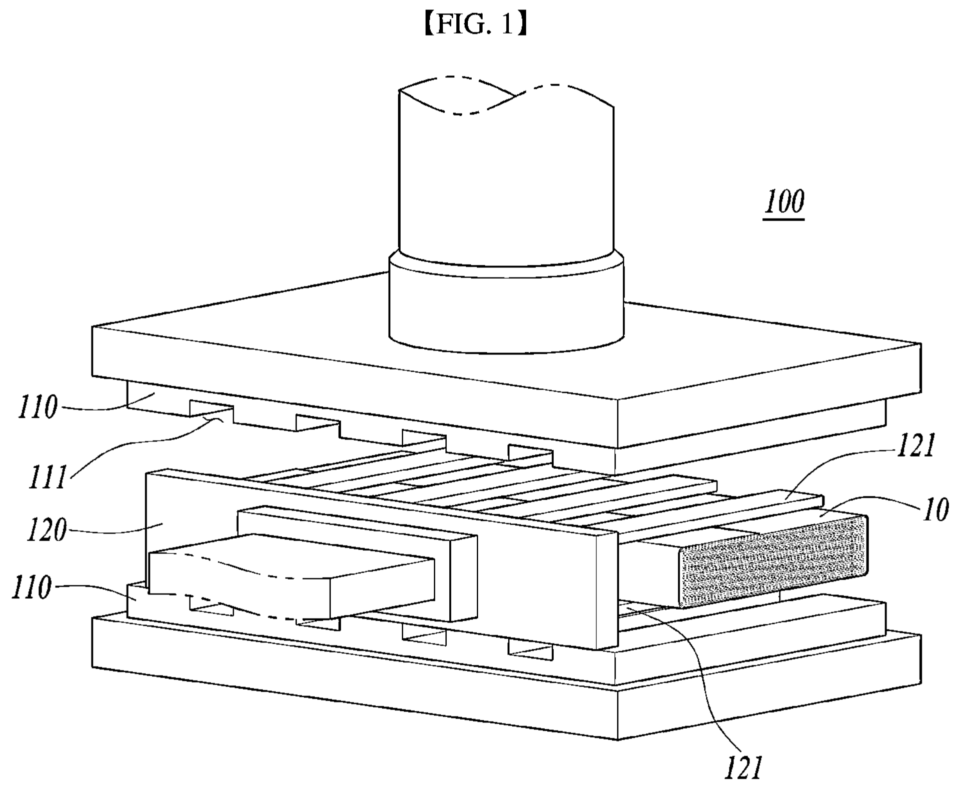

【FIG. 2】
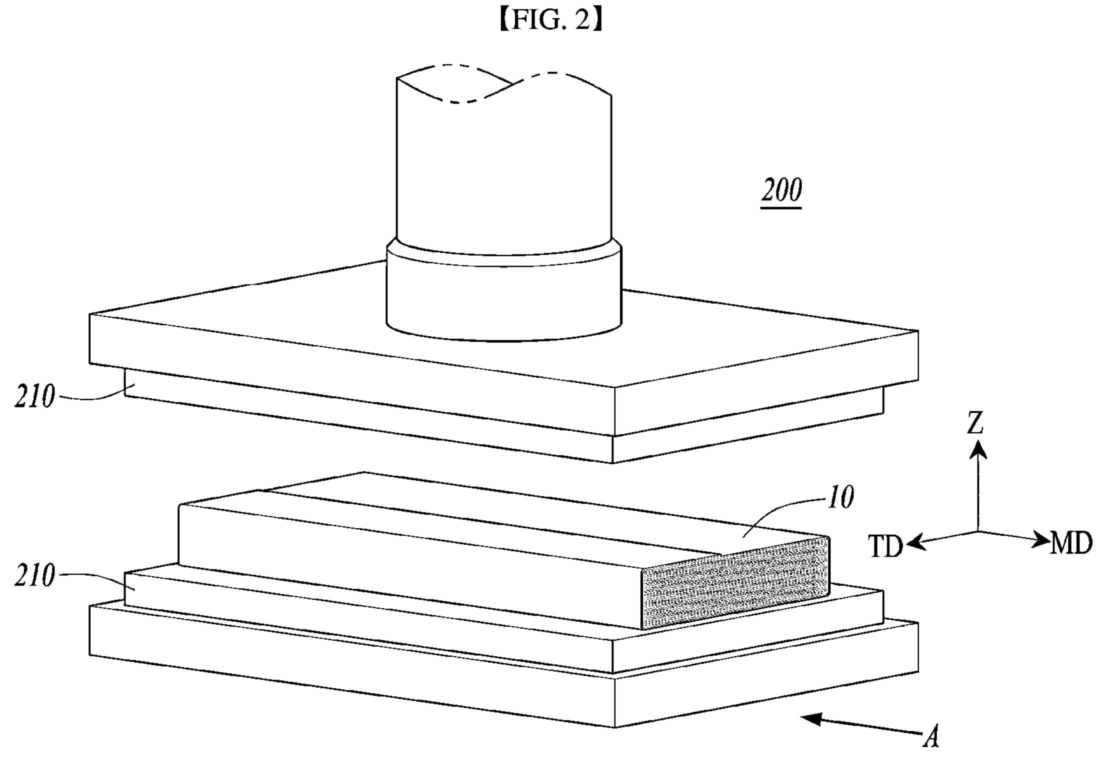

【FIG. 3】
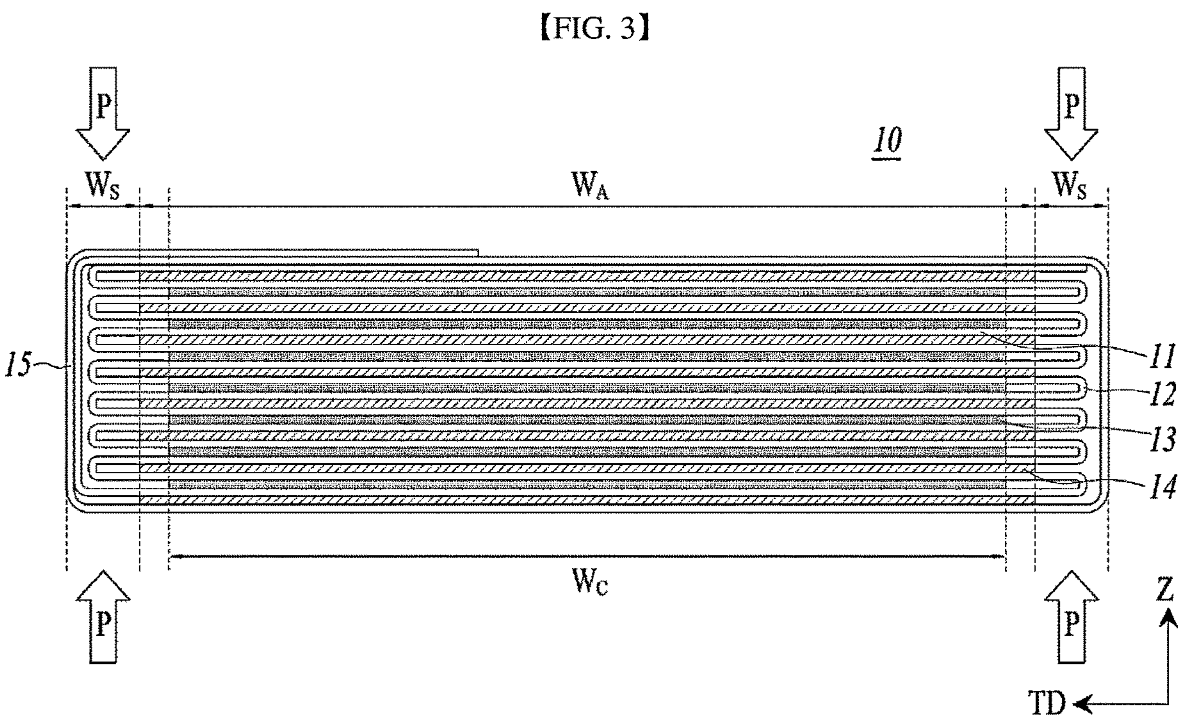
Related Art

【FIG. 4】
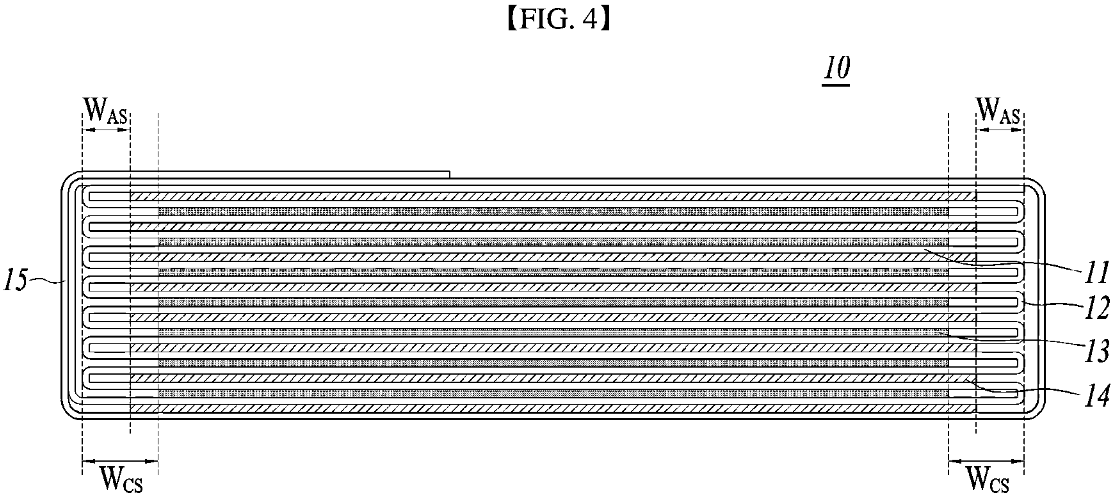

【FIG. 5】
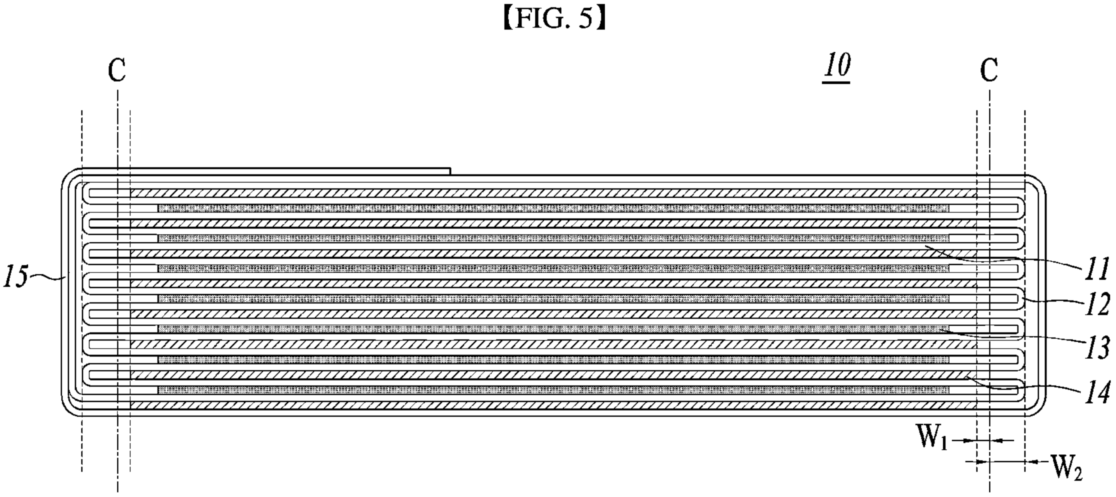

【FIG. 6】
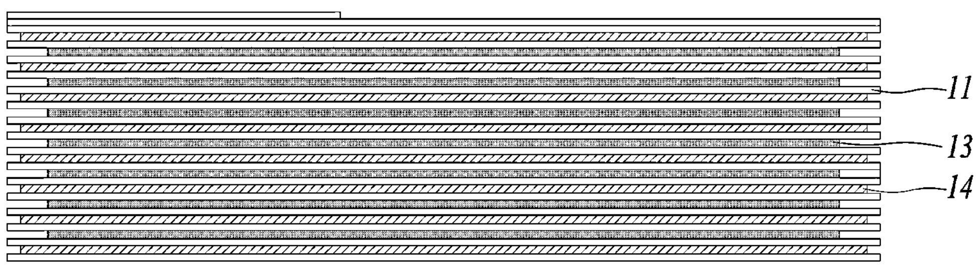

METHOD FOR MANUFACTURING ELECTRODE ASSEMBLY

CROSS REFERENCE TO PRIOR APPLICATIONS

This application is a National Phase entry pursuant to 35 U.S.C. § 371 of International Application No. PCT/KR2023/010891, filed on Jul. 27, 2023, and claims the benefit of the filing date of Korean Patent Application No. 10-2022-0098947 filed with the Korean Intellectual Property Office on Aug. 9, 2022, the entirety of which is incorporated herein.

FIELD

The present disclosure relates to a method for manufacturing an electrode assembly including a zigzag-type separator, and to a method for improving electrolyte wettability of the electrode assembly.

BACKGROUND

An electrochemical device converts chemical energy into electrical energy using an electrochemical reaction. Recently, lithium secondary batteries, which have high energy density and voltage and a long cycle life, and are usable in various fields, are widely used. Recently, with an increasing demand for electric vehicles and energy storage devices, materials and structures for maximizing capacity and energy density have been developed.

A secondary battery may include an electrode assembly which includes a positive electrode, a negative electrode, and a separator arranged between the positive electrode and the negative electrode, and the electrode assembly may be manufactured by being received in a case together with an electrolyte. Secondary batteries can be classified into a pouch type, a cylindrical type, a prismatic type, a coin type, etc. according to the shape of the case in which the electrode assembly is received, and it may be classified into a jelly-roll type, a stacking type, etc. according to the manufacturing method or shape of the electrode assembly.

The stacking type electrode assembly is manufactured by stacking a plurality of a positive electrode, a separator, and a negative electrode prepared in a predetermined size, and its productivity was low due to inconvenience in the transfer of individual electrodes and separators and difficulty in maintenance of constant arrangement during stacking. Accordingly, a zigzag stacking type of electrode assembly has been developed in which a positive electrode and a negative electrode are alternately arranged between adjacent foldings while a long sheet-shaped separator is being folded in a zigzag pattern. For example, a zigzag electrode assembly may be manufactured by tilting or swinging the table on which the electrode assembly is being stacked when a long sheet-type separator wound on a cylinder is supplied, or by arranging each electrode between them while folding the separator in a zigzag pattern by reciprocating the supply roll that transfers the separator. The zigzag stacking has excellent productivity due to its simple process compared to the conventional methods, and it is possible to stably maintain the stacked structure even if the adhesive strength of the separator is relatively low or absent.

In general, during the zigzag stacking, the separator is folded at a certain gap and thereby forms a bend, and the gap is set to be larger than the widths of a positive electrode and a negative electrode so as to secure an extra space. Therefore, the zigzag electrode assembly includes an area in which the bend consisting only of separators is stacked on both sides. However, the area has an empty space compared to the area where electrodes and separators are stacked together and are not fixed, and thus, folding or clattering occurs. Therefore, there was a problem in that it is difficult to insert the electrode assembly into a case or pouch. In order to solve this problem, heat and pressure were applied to the bend to thereby allow the bend and/or adjacent bends. However, this had a problem in that the pores formed in the separator were closed in the process in which the separator was attached, thereby reducing air permeability, increasing resistance, and reducing electrolyte wettability.

SUMMARY

An object of the present disclosure is to provide a method for manufacturing a zigzag electrode assembly which has excellent ability to be inserted into a case or pouch due to the absence of folding of the separator bend or clattering thereof and excellent electrolyte wettability of the separator.

In an aspect of the present disclosure, there is provided a method for manufacturing an electrode assembly, which includes: (S10) forming a laminate in which a positive electrode, a separator, and a negative electrode are alternately disposed by alternately arranging positive electrodes and negative electrodes on a separator, which is zigzag folded and forms a bend; (S20) fixing positions of the positive electrode and the negative electrode relative to the separator by applying heat and pressure to the laminate; (S30) attaching the positive electrode, the separator, and the negative electrode by applying heat and pressure to the laminate; and (S40) forming an electrode assembly by cutting a side of the laminate, wherein the side of the laminate includes the bend.

In the method for manufacturing an electrode assembly, a length of the negative electrode in a width direction may be 1% to 10% longer than that of the positive electrode in a width direction.

The method for manufacturing an electrode assembly further includes a step (S11) of encompassing an outer circumferential surface of a laminate formed in the step (S10) with an end part of the separator.

In the method for manufacturing an electrode assembly, a pressure of 1 MPa to 6 MPa may be applied to the laminate at a temperature of 50° C. to 60° C. for 1 to 60 seconds in the step (S20).

In the method for manufacturing an electrode assembly, the positions of the positive electrode and the negative electrode relative to the separator are fixed by partially attaching the positive electrode and the separator, and the separator and the negative electrode may be partially attached, respectively, in the step (S20).

In the method for manufacturing an electrode assembly, a pressure of 1 MPa to 6 MPa may be applied to the laminate at a temperature of 50° C. to 60° C. for 1 to 60 seconds in the step (S30).

In the method for manufacturing an electrode assembly, the positive electrode and the separator, and the separator and the negative electrode may be completely attached, respectively.

In the method for manufacturing an electrode assembly, the side may be comprised of the separator including the bend, and the electrode assembly may not include the bend.

In the method for manufacturing an electrode assembly, the bend may extend parallel to a longitudinal direction of the separator.

In the method for manufacturing an electrode assembly, a gap between the bend and the negative electrode may be smaller than a gap between the bend and the positive electrode.

In the method for manufacturing an electrode assembly, a length of the negative electrode in a width direction is 10 to 15 times the gap between the bend and the negative electrode.

In the method for manufacturing an electrode assembly, the side of the laminate may be cut parallel to a height direction of the electrode assembly in the step (S40).

In the method for manufacturing an electrode assembly, the side is cut at a cutting point between the negative electrode and the bend in the step (S40), wherein a ratio of a gap between the cutting point and the negative electrode to a gap between the cutting point and the bend may be 1:8 to 1:10.

In the method for manufacturing an electrode assembly, the gap between an end of the separator and the positive electrode of the electrode assembly may be 1.5 to 2 times the gap between the end of the separator and the negative electrode of the electrode assembly.

In another aspect of the present disclosure, there is provided an electrode assembly manufactured by a method according to the method for manufacturing an electrode assembly described above.

The manufacturing method of the present disclosure provides an electrode assembly which has excellent productivity and a structure without folding or clattering of the separator, and thus can improve the productivity of an electrochemical device including the electrode assembly.

Additionally, in the electrode assembly manufacture according to the manufacturing method of the present disclosure, the electrolyte is uniformly impregnated into the separator, thereby being capable of preventing or minimizing the precipitation of lithium in the form of a dendrite in the separator.

BRIEF DESCRIPTION OF DRAWINGS

FIG. 1 is a diagram illustrating the step of fixing the positions of a positive electrode and a negative electrode relative to a separator by applying pressure to a laminate during the process of manufacturing an electrode assembly according to an embodiment of the present disclosure.

FIG. 2 is a diagram illustrating the step of attaching a positive electrode, separator, and a negative electrode by applying heat and pressure to a laminate during the process of manufacturing an electrode assembly according to an embodiment of the present disclosure.

FIG. 3 is a diagram illustrating a cross-section of a laminate in a conventional electrode assembly manufacturing process.

FIG. 4 is a diagram illustrating a cross-section of a laminate during the process of manufacturing an electrode assembly according to an embodiment of the present disclosure.

FIG. 5 is a diagram illustrating a cross-section of a laminate during the process of manufacturing an electrode assembly according to an embodiment of the present disclosure.

FIG. 6 is a diagram illustrating a cross-section of an electrode assembly according to an embodiment of the present disclosure.

DETAILED DESCRIPTION

Hereinafter, each constitution of the present disclosure will be described in detail so that those skilled in the art can easily practice the same in the technical field to which the present disclosure belongs; however, these are merely illustrative embodiments, and the scope of rights of the present disclosure is not limited by the following contents.

As used herein, the term "include" is used when listing materials, compositions, devices, and methods useful in the present disclosure, but is not limited to the examples listed.

As used herein, the term "about" and "substantially" are used to indicate a range of numerical values or degrees or approximating thereto, taking inherent manufacturing and material tolerances into consideration, and are used to prevent infringers from unfairly exploiting the stated disclosure in which the exact or absolute numerical values are provided to aid understanding of the present disclosure.

As used herein, the term "an electrochemical device" may refer to a primary battery, a secondary battery, a super capacitor, etc. The electrochemical device may be a lithium ion secondary battery, or of a pouch type, a cylindrical type, a prismatic type, or a coin type, but the specific shape of the electrochemical device is not limited thereto.

As used herein, the term "separator" may refer to a functional separator in which a porous coating layer containing an inorganic material and a binder is formed on at least one surface of a porous substrate (e.g., a polyolefin substrate or nonwoven fabric), but is not limited thereto. The separator may comprehensively refer to a free-standing separator formed of an inorganic material and a binder without a porous substrate or a separator comprised of a porous substrate without a porous coating layer.

As used herein, the term "electrode" comprehensively refers to "a positive electrode" and "a negative electrode", and may mean that an electrode active material is applied to at least one surface of a material having conductivity without causing a chemical change in an electrochemical device and then dried. The types of the material and the electrode active material are not limited as long as they can be used in an electrochemical device.

As used herein, the term "gap" means the shortest distance between specified points.

Hereinafter, an embodiment of the present disclosure will be described in detail with reference to the accompanying drawings. The drawings may be exaggerated, omitted, or schematically illustrated in order to explain or emphasize the content of the embodiment of the present disclosure.

In an embodiment of the present disclosure, there is provided a method for manufacturing an electrode assembly, which includes (S10) forming a laminate in which a positive electrode, a separator, and a negative electrode are alternately disposed by alternately arranging positive electrodes and negative electrodes on a separator, which is zigzag folded and forms a bend thereon; (S20) fixing positions of the positive electrode and the negative electrode relative to the separator by applying heat and pressure to the laminate; (S30) attaching the positive electrode, the separator, and the negative electrode by applying heat and pressure to the laminate; and (S40) forming an electrode assembly by cutting a side of the laminate. In particular, the side includes the bend.

The step (S10) is a step in which a separator is folded in a zigzag pattern to form a bend, and a positive electrode and a negative electrode are alternately arranged on the separator where the bend is formed, thereby forming a laminate in which a positive electrode, a separator, and a negative electrode are alternately arranged.

In the step (S10), the separator may be one in which the length in a longitudinal direction (or MD direction; Machine Direction) is longer than the length in a width direction (or TD direction; Transverse Direction). The bend may be formed by folding the separator in a zigzag pattern with a predetermined gap along the MD direction. For example, the bend may extend parallel to an edge of the separator in a TD direction. The predetermined gaps may be the same as or different from one another, but may preferably be provided to be equal to one another and to be longer than the length of a positive electrode or a negative electrode in a width direction.

The separator, the positive electrode, and the negative electrode may each have a rectangular shape, but are not limited thereto. For example, the separator, the positive electrode, and the negative electrode may each have a rectangular shape in which the length of an MD direction is longer than a TD direction. A plurality of positive electrodes and negative electrodes may be arranged along the MD direction of the separator, and these electrodes may be arranged such that the MD direction of the separator and the TD direction of the positive electrode and the negative electrode are parallel to each other. The number of the positive electrodes and the negative electrodes may be determined according to the capacity required in an electrochemical device to be finally manufactured.

The length of the positive electrode in the MD direction may be the same as the length of the negative electrode in the MD direction. The length of the negative electrode in the TD direction ($W_A$) may be 1% to 10% longer than the length of the positive electrode ($W_C$) based on the length of the positive electrode ($W_C$). When the length is less than the above range, a problem in which lithium is precipitated as a dendrite on the surface of a negative electrode may occur due to the repeated use of an electrochemical device. When the length exceeds the above range, the effect of preventing lithium precipitation is no longer improved, and a problem in which it is difficult to constantly arrange the electrodes in an electrode assembly may occur.

The positive electrode and the negative electrode may be alternately arranged between adjacent bends formed in the separator, respectively. Accordingly, the laminate may include a structure in which the positive electrode and the negative electrode are repeatedly arranged relative to the separator interposed therebetween. Preferably, the positive electrode and the negative electrode may be aligned so that the respective center lines in the TD direction coincide.

After the step (S10), a step (S11) of encompassing the outer circumferential surface of the laminate formed in the step (S10) with the end part of the separator may be further included.

The separator may be one in which the length in the MD direction is longer than that in the TD direction, and a plurality of bends may be formed by being folded in a zigzag pattern at a predetermined gap along the MD direction, but the end part may be extended without being folded. Referring to FIGS. 3 to 5, the end part (15) of the separator may encompass the outer circumferential surface of the laminate (10) one or more times, and an interface between the electrodes (13) and (14) constituting the laminate (10) and the separator (11) may be compressed by the pressure that encompassed the end part (15), thereby stably maintaining the contact between the electrode and the separator. For example, the end part (15) of the separator may encompass the bend (12) located on both sides of the laminate.

The step (S20) is to apply pressure to the laminate formed in the step (S10) and thereby fix the positions of the positive electrode and the negative electrode relative to the separator. FIG. 1 is a conceptual diagram illustrating the step (S20) of a method for manufacturing an electrode assembly according to an embodiment of the present disclosure.

Referring to FIG. 1, the step (S20) may be performed using a first press device (100). The first press device (100) may partially press the laminate (10) to fix the relative positions of electrodes aligned in the laminate (10) relative to the separator. The first press device (100) may include a pressure plate (110) that presses the laminate (10) and a fixing part (120) that holds the laminate (10) while the pressure plate (110) presses the laminate (10).

The laminate (10) includes a structure in which a positive electrode, a separator, and a negative electrode are alternately stacked through the step (S10) or the step (S11), but the position of the positive electrode or the negative electrode relative to the separator is not completely fixed. The laminate (10) may be arranged between the pressure plates (110) provided vertically while being held by one or more tongs (121) provided on the fixing part (120). The pressure plate plates (110) are provided with a groove (111) at a position corresponding to the tongs (121) to press only the laminate (10) fixed to the tongs (121) without pressing the tongs (121). The first press device (100) can attach the separators and electrodes stacked on the rest of the laminate (10) to one another except for the parts caught by the tongs (121). The shape and number of the pressure plates (110) and tongs (121) are not limited to those shown in FIG. 1.

The step (S20) may be to apply a pressure of 1 MPa to 6 MPa to the laminate (10) at a temperature of 50° C. to 100° C. for 1 second to 30 minutes. Preferably, the step (S20) may be to apply a pressure of 1 MPa to 6 MPa to the laminate (10) at a temperature of 50° C. to 60° C. for 1 to 60 seconds. The step (S20) is to induce a partial attachment between the separators and the electrodes in the laminate (10) so as to fix the position of the electrodes relative to the separator. Preferably, the step (S20) may be to fix the electrodes so as not to move while being arranged at a position where the center line of the length of the electrodes in the TD direction coincides with the center line of a gap between adjacent bends of the separator. When the temperature and the pressure are within the above range, the adhesive strength between the separator and the electrodes after the step (S20) may be 5 gf/20 mm or greater. The positions of the electrodes relative to the separator can be fixed within the range of the adhesive strength. When the pressure is less than 1 MPa, the positions of the electrodes are not fixed and the electrodes may deviate from the predetermined positions during the handling of the laminate (10). When the pressure exceeds 6 MPa, the active material layer formed on the electrodes is destroyed or the pore structure formed on the separator collapses, thereby causing problems in air permeability and electrical resistance of the separator.

The laminate (10) pressed in the step (S20) may be removed from the first press device (100) by the tong (121) and transferred to a second press device (200).

The step (S30) is a step of attaching the positive electrode, the separator, and the negative electrode by applying heat and pressure to the laminate (10) pressed in the step (S20). FIG. 2 is a conceptual diagram illustrating the step (S30) of the manufacturing method of an electrode assembly according to an embodiment of the present disclosure.

Referring to FIG. 2, the step (S30) may be performed using the second press device (200). The second press device (200) can attach the separators and electrodes included in the laminate (10) to one another by pressing the entirety of both surfaces of the laminate (10). Specifically, both sides of the laminate (10) are surfaces that do not include a separator bend, and refer to surfaces on which electrodes and separators are alternately laminated. The step (S30) means that a positive electrode and a separator, and a separator and a negative electrode stacked adjacent to one another are respectively attached to one another by applying heat and pressure to the laminate (10).

Referring to FIG. 2, the step (S30) may be performed using the second press device (200). The second press device (200) can attach the separators and electrodes included in the laminate (10) by thermally compressing both surfaces of the laminate (10). The second press device (200) may include pressure plates (210) for thermal compression of the laminate (10).

In the laminate (10), the electrodes and the separator are partially attached through the step (S20) so that the positions of the electrodes relative to the separator are fixed, but the separators and the electrodes are not completely attached to one another. The laminate (10) may be arranged between the pressure plates (210) provided above and below, and the pressure plates (210) can thermally compress both surfaces of the laminate (10). The second press device (200) can thermally compress both surfaces of the laminate (10), including the part that was not held and pressed by the tongs (121) in the previous step, and can attach the separators and the electrodes to one another by thermal compression. The shape and the number of pressure plates (210) are not limited to those shown in FIG. 2.

The step (S30) may be to apply a pressure of 1 MPa to 6 MPa to the laminate (10) at a temperature of 50° C. to 100° C. for 1 second to 30 minutes. Preferably, the step (S30) may be to apply a pressure of 1 MPa to 6 MPa to the laminate (10) at a temperature of 50° C. to 60° C. for 1 to 60 seconds. More preferably, in the step (S30), a higher temperature and higher pressure than those in the step (S20) may be applied. The step (S30) is to completely attach the positive electrode and the separator, and the separator and the negative electrode in the laminate (10). When the pressure is less than 1 MPa, the electrodes and the separator may be separated during the manufacturing process and use of an electrochemical device, and a short circuit may occur due to a contact between the electrodes. When the pressure exceeds 6 MPa, the active material layer formed on the electrodes may be destroyed or the pore structure formed on the separator collapses, thereby causing problems in air permeability and electrical resistance of the separator.

The laminate (10) thermally compressed in step (S30) may be removed from the second press device (200) and then processed into an electrode assembly through a subsequent process.

The step (S40) is a step of forming an electrode assembly by cutting a side of the laminate (10) thermally compressed in the step (S30). FIGS. 3 to 5 are conceptual diagrams illustrating a cross-section of the laminate (10) that has undergone the step (S30) in FIG. 2 viewed from the direction A. The laminate (10) may be one in which a length in an MD direction is longer than a length in a TD direction, and the direction may be a direction parallel to the MD direction of the laminate (10).

FIG. 3 is a conceptual diagram illustrating a process of applying heat and pressure to an area where separators are stacked in order to solve the problem of being folded or clattering of conventional separators.

Referring to FIG. 3, the laminate (10) for forming a zigzag electrode assembly has a structure in which positive electrodes (13) and negative electrodes (14) are alternately arranged with a separator (11) interposed therebetween, and the separator (11) may include one or more bends (12) formed by being folded in a zigzag pattern. For example, the length of the negative electrode (14) in the TD direction ($W_A$) may be longer than the length of the positive electrode (13) in the TD direction, whereas the length of the laminate (10) in the TD direction may consist of the length of the negative electrode (14) in the TD direction ($W_A$) and the length ($W_S$) consisting only of the separator (11). The part consisting only of the separator (11) may have a structure in which the separator (11) including the bends (12) are stacked in the height direction Z of the laminate (10), and may include an empty space because no electrode is arranged therein. When the laminate (10) is directly inserted into a case, the part consisting only of the separator (11) may be inserted in a folded state, or the separator 11 may clatter and the separator (11) may be torn. Conventionally, the folding or clattering of the separators (11) was prevented by way of improving the strength of the separators (11) corresponding to the length ($W_S$), by attaching adjacent separators (11) by applying (P) heat and pressure to the part consisting only of the separators (11) up and down (in a direction parallel to the Z direction). However, there were problems in that the pore structure formed in the separators (11) are collapsed in the process that the separators (11) are attached, thereby resulting in lower air permeability and poor impregnation of the electrolyte into the separators (11).

FIGS. 4 and 5 are conceptual diagrams illustrating the step (S40) as a means for solving the problems of the prior art as shown in FIG. 3, and FIG. 6 is a conceptual diagram illustrating an electrode assembly (20).

Referring to FIGS. 4 to 6, the step (S40) means to remove at least one side of the laminate (10) by cutting the separator (11) along a predetermined point (C) on the separator (11) in the laminate (10). The side may include a bend (12), and preferably, the step (S40) may be cutting both sides of the laminate (10). The electrode assembly (20) formed according to the step (S40) may not include the bend (12).

The cutting may be performed by press-cutting, laser, thermal wire, etc. Preferably, the step (S40) may be to cut a blade in a direction parallel to the height direction (Z direction) of the laminate (10), and the direction may be parallel to the height direction of the electrode assembly (20). During the cutting, only the separator (11) may be cut in a state where the part where the electrodes are stacked and the side including the bend (12) are fixed, respectively.

In an embodiment of the present disclosure, there is provided an electrode assembly (20) with a structure that can prevent the folding or clattering of the separator (11) by determining the relationship between the length of the separator in the TD direction and the length of the electrodes in the TD direction and the specific positions of the cutting point (C), while maintaining the advantages of manufacturing the existing zigzag electrode assembly.

Specifically, in the laminate (10), it can be seen that the gap ($W_{AS}$) between the bend (12) and the negative electrode (14) may be smaller than the gap ($W_{CS}$) between the bend (12) and the positive electrode (13). The cutting point (C) is located between the bend (12) and the negative electrode (14), and according to the cutting, the separator (11) of a predetermined length is left from the positive electrode (13) and the negative electrode (14), respectively.

Specifically, the length ($W_A$) of the negative electrode (14) in the TD direction may be 10 to 15 times the gap ($W_{AS}$) between the bend (12) and the negative electrode (14). When the length ($W_A$) of the negative electrode (14) in the TD direction is less than 10 times the gap ($W_{AS}$) between the bend (12) and the negative electrode (14), during the cutting process, at least a portion of the separator (11) is folded toward the electrode direction. When the length ($W_A$) of the negative electrode (14) in the TD direction exceeds 15 times the gap ($W_{AS}$) between the bend (12) and the negative electrode, the separator (11) is torn during the cutting process.

Specifically, the step (S40) is to cut a cutting point (C) between the negative electrode (14) and the bend (12), and the ratio of a gap ($W_1$) between the cutting point (C) and the negative electrode (14) to a gap ($W_2$) between the cutting point (C) and the bend (12) may be 1:8 to 1:10. When the ratio of $W_1$:$W_2$ is less than 1:8, at least a portion of the separator (11) is folded toward the electrode direction during the cutting process. When the ratio of $W_1$:$W_2$ exceeds 1:10, the separator (11) is torn during the cutting process.

In the electrode assembly (20) formed through cutting according to the step (S40), the gap between the end (point C) of the separator (11) and the positive electrode (13) may be 1.5 to 2 times the gap between the end of the separator (11) and the negative electrode (14). It is preferred that the ratio be maintained as-is even if the sizes of the positive electrode (13) and the negative electrode (14) are changed.

In another embodiment of the present disclosure, there is provided an electrode assembly prepared by the method according to the embodiment described above and an electrochemical device including the electrode assembly.

The electrode assembly is formed through cutting of a side thereof and does not include bend of the separator; therefore, the electrode assembly is similar to the conventional stacked electrode assembly in appearance. However, since the Lamination and Stack (L&S) electrode assembly does not go through the step of fixing the positions of the electrodes relative to the separator, the alignment of the electrodes is misaligned in the process of quickly stacking the separator and the electrodes, and uniform attachment between the separator and the electrodes cannot be achieved.

Therefore, the electrode assembly according to an embodiment of the present disclosure can provide aligned arrangement of electrodes and uniform attachment of electrodes compared to the conventional stacked electrode assembly, and the folding or clattering of the separator can be prevented, thereby being capable of reducing defects when inserting the same into a case.

The shape of the case or pouch for inserting the electrode assembly is not limited. For example, the electrochemical device may be a cylindrical type, a prismatic type, a coin type, or a pouch type lithium secondary battery. The lithium secondary battery may be packed or modularized as a unit cell and used for electric vehicles (BEVs), hybrid electric vehicles (HEVs), plug-in hybrid vehicles (PHEVs), power storage devices, etc.

Hereinafter, the present disclosure will be described in more detail through specific Examples and Experimental Examples. The following Examples and Experimental Examples are for illustrating the present disclosure, and the present disclosure is not limited by the following Examples and Experimental Examples.

Example 1

A separator with a thickness of 15 μm coated with a slurry containing an inorganic material and a binder was prepared, 30 and 31 each of positive electrodes with a size of 90 mm×315 mm and negative electrodes with a size of 95.5 mm×320 mm were prepared. The separator was folded 20 times in a zigzag pattern with a gap of 98.5 mm, leaving an end part, and a laminate was prepared by arranging positive electrodes and negative electrodes in order while folding the separator. In the laminate, the gap between a negative electrode and the separator bend is 30 mm, and the gap between a positive electrode and the bend is 32.75 mm. The laminate was encompassed one turn with the separator end part.

The laminate was arranged on a first press device and pressed with a pressure of 2 MPa at 60° C. for 1 minute. Then, the laminate was arranged in a second press device and thermally compressed with a pressure of 3 MPa at 70° C. for 30 seconds.

Both sides of the laminate were cut by a press-cutting the point where the ratio of a gap ($W_1$) between the negative electrode and a cutting point (C) to a gap ($W_2$) between the cutting point (C) and a bend was 1:9 in a gap ($W_{AS}$) between the negative electrode and the bend, and thereby an electrode assembly with a gap ($W_1$) of 3 mm between the negative electrode and the separator was prepared.

Comparative Example 1

Using the same type and number of separators, a positive electrode, and a negative electrode as those used in Example 1, a laminate was pressed and thermally compressed in the same manner.

Referring to FIG. 3, an electrode assembly was prepared by thermally compressing the laminated portion above and below on both sides of the laminate stacked only with a separator ($W_S$) at 120° C. for 20 seconds.

Comparative Example 2

Use the same type of separator, a positive electrode, and a negative electrode as used in Example 1, in which 61 separators with a size of 100 mm×380 mm were prepared, a positive electrode, a separator, and a negative electrode were stacked in order to form a laminate.

Both sides of the laminate were thermally compressed at 60° C. with a pressure of 18 kgf/cm at a speed of 220 cpm to prepare an electrode assembly.

Comparative Example 3

An electrode assembly was prepared by the same method as Example 1, except that both sides of the laminate were cut by a press-cutting the point where the ratio of a gap ($W_1$) between the negative electrode and a cutting point (C) to a gap ($W_2$) between the cutting point (C) and a bend was 1:7 in a gap ($W_{AS}$) between the negative electrode and the bend, and thereby an electrode assembly with a gap ($W_1$) of 3.75 mm between the negative electrode and the separator.

Comparative Example 4

An electrode assembly was prepared by the same method as Example 1, except that both sides of the laminate were cut by a press-cutting the point where the ratio of a gap ($W_1$) between the negative electrode and a cutting point (C) to a gap ($W_2$) between the cutting point (C) and a bend was 1:11 in a gap ($W_{AS}$) between the negative electrode and the bend, and thereby an electrode assembly with a gap ($W_1$) of 2.5 mm between the negative electrode and the separator.

Experimental Example 1. Confirmation of State of Long Side Separator in Electrode Assembly After preparing the electrode assembly according to Example 1 and Comparative Examples 1 to 6, the state of the separators included in each electrode assembly was visually checked. Thereafter, each electrode assembly was completely inserted into the pouch, and then pulled out again to visually check the state of the separator, and the results (○: intact, Δ: separator being folded, x: separator being torn) are summarized in Table 1 below.

TABLE 1

| | State of Separator Immediately After Manufacture | State of Separator After Insertion of Pouch |
|---|---|---|
| Comparative Example 1 | ○ | ○ |
| Comparative Example 2 | Δ | Δ |
| Comparative Example 3 | Δ | x |
| Comparative Example 4 | x | x |
| Example 1 | ○ | ○ |

As shown in Table 1 above, the electrode assembly of Comparative Example 2, which is a stacked electrode assembly, folding was confirmed at the edge of the separator in the MD direction immediately after manufacture. In Example 1 and Comparative Example 1, in which a process for preventing separator folding in the zigzag electrode assembly was added, the separator state was intact immediately after manufacture and even after pouch insertion.

However, in the Examples of the present disclosure and Comparative Examples 3 to 6 in which the dimensions of the separator and a negative electrode were adjusted and cut differently, the separator was either folded during the cutting process or the folded separator was torn while being inserted into a pouch.

Experimental Example 2. Electrolyte Wettability of Separator

After preparing the electrode assembly according to Example 1 and Comparative Examples 1 to 6, each electrode assembly was completely inserted into a pouch. 156 g of electrolyte (a weight ratio of EC to EMC=3:7) was injected into each pouch, and each pouch was vacuum sealed.

After placing each pouch at room temperature for 72 hours, each electrode assembly was taken out and disassembled to check the interface between the electrode and the separator, and the time (hr) for all separator interfaces are impregnated with the electrolyte was checked and is summarized in Table 2 below.

TABLE 2

| | Wettability (hr) |
|---|---|
| Comparative Example 1 | >72 |
| Comparative Example 2 | 23 |
| Comparative Example 3 | 21 |
| Comparative Example 4 | 22 |
| Example 1 | 20 |

As shown in Table 2, in Comparative Example 1 in which both sides of the electrode assembly including a separator bend were thermally compressed, the entire separator interface was not uniformly impregnated even after 72 hours.

Description of Reference Numerals

| | |
|---|---|
| 10: laminate | 11: separator |
| 12: bend | 13: a positive electrode |
| 14: a negative electrode | 15: separator end part |
| 20: electrode assembly | |
| 100: first press device | 110: pressure plate |
| 111: groove | 120: fixing part |
| 121: tong | 200: second press device |
| 210: pressure plate | |
| $W_A$: length in TD direction of negative electrode | |
| $W_C$: length in TD direction of positive electrode | |
| $W_{AS}$: gap between negative electrode and bend | |
| $W_{CS}$: gap between positive electrode and bend | |
| C: cutting point | |
| $W_1$: gap between cutting point and negative electrode | |
| $W_2$: gap between cutting point and bend | |

The invention claimed is:

1. A method for manufacturing an electrode assembly, the method comprising:

(S10) forming a laminate in which a positive electrode, a separator, and a negative electrode are alternately disposed by alternately arranging positive electrodes and negative electrodes on a separator, which is zigzag folded and forms a bend;

(S20) fixing positions of the positive electrode and the negative electrode relative to the separator by applying heat and pressure to the laminate, wherein the positions of the positive electrode and the negative electrode relative to the separator are fixed by partially attaching the positive electrode and the separator, and the separator and the negative electrode, respectively;

(S30) attaching the positive electrode, the separator, and the negative electrode by applying heat and pressure to the laminate, wherein the positive electrode and the separator, and the separator and the negative electrode are completely attached, respectively; and (S40) forming an electrode assembly by cutting a side of the laminate, wherein the side of the laminate comprises the bend.

2. The method of claim 1, wherein the bend extends parallel to a longitudinal direction of the separator.

3. The method of claim 2, wherein the side of the laminate is cut parallel to a height direction of the electrode assembly in the step (S40).

4. The method of claim 3, wherein the side is cut at a cutting point between the negative electrode and the bend in the step (S40), wherein a ratio of a gap between the cutting point and the negative electrode and a gap between the cutting point and the bend is 1:8 to 1:10.

5. The method of claim 3, wherein, in the electrode assembly, a gap between an end of the separator and the positive electrode is 1.5 to 2 times a gap between the end of the separator and the negative electrode.

6. The method of claim 2, wherein a gap between the bend and the negative electrode is smaller than a gap between the bend and the positive electrode.

7. The method of claim 6, wherein a length of the negative electrode in a width direction is 10 to 15 times a gap between the bend and the negative electrode.

8. The method of claim 1, wherein a length of the negative electrode in a width direction is 1% to 10% longer than that of the positive electrode in a width direction.

9. The method of claim 1, wherein the method further comprises a step (S11) of encompassing an outer circumferential surface of a laminate formed in the step (S10) with an end part of the separator.

10. The method of claim 1, wherein a pressure of 1 MPa to 6 MPa is applied to the laminate at a temperature of 50° C. to 60° C. for 1 to 60 seconds in the step (S20).

11. The method of claim 1, wherein a pressure of 1 MPa to 6 MPa is applied to the laminate at a temperature of 50° C. to 60° C. for 1 to 60 seconds in the step (S30).

12. The method of claim 1, wherein the side is comprised of the separator including the bend, and the electrode assembly does not include the bend.

13. An electrode assembly manufactured by a method according to claim 1.

* * * * *